United States Patent
Sato

(10) Patent No.: US 7,860,148 B2
(45) Date of Patent: Dec. 28, 2010

(54) RECEIVING CIRCUIT AND RECEIVING METHOD

(75) Inventor: Takahiro Sato, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 824 days.

(21) Appl. No.: 11/727,848

(22) Filed: Mar. 28, 2007

(65) Prior Publication Data

US 2007/0230603 A1 Oct. 4, 2007

(30) Foreign Application Priority Data

Mar. 29, 2006 (JP) .............................. 2006-091158

(51) Int. Cl.
*H04B 1/00* (2006.01)

(52) U.S. Cl. ...................... 375/132; 375/260; 375/316; 342/116; 455/168.1

(58) Field of Classification Search ................. 375/132, 375/260; 342/116
See application file for complete search history.

(56) References Cited

U.S. PATENT DOCUMENTS

| | | | |
|---|---|---|---|
| 7,397,758 B1 * | 7/2008 | Hart et al. ................... | 370/208 |
| 7,443,783 B2 * | 10/2008 | DeChamps et al. .......... | 370/208 |
| 2003/0215021 A1 * | 11/2003 | Simmonds ................... | 375/260 |
| 2004/0001554 A1 * | 1/2004 | Sun et al. .................... | 375/260 |
| 2005/0169408 A1 * | 8/2005 | Kim ............................ | 375/343 |
| 2006/0083290 A1 * | 4/2006 | Shin et al. ................... | 375/131 |

OTHER PUBLICATIONS

IEEE P802.15-03/268r1 Wireless Personal Area Networks, Sep. 2003.
IEEE P802.15-03/267r6 Working Group for Wireless Personal Area Networks(WPANs), Sep. 2003.

* cited by examiner

*Primary Examiner*—Mohammad H Ghayour
*Assistant Examiner*—Sung Ahn
(74) *Attorney, Agent, or Firm*—McGinn Intellectual Property Law Group, PLLC

(57) ABSTRACT

A receiving circuit which receives information using a multi-carrier signal comprises a phase rotation amount calculator which calculates a phase rotation amount of a multi-carrier signal included in a first frequency band according to a pilot-sub carrier included in the first frequency band, a converter which calculates a phase rotation amount of a multi-carrier signal included in a second frequency band according to the phase rotation amount of the multi carrier signal included in the first frequency band.

10 Claims, 11 Drawing Sheets

16QAM

QPSK

| RECEIVING BAND | CONVERSION COEFFICIENT | | |
|---|---|---|---|
| BAND1 | 1 | $F_{BAND2}/F_{BAND1}$ | $F_{BAND3}/F_{BAND1}$ |
| BAND2 | $F_{BAND1}/F_{BAND2}$ | 1 | $F_{BAND3}/F_{BAND2}$ |
| BAND3 | $F_{BAND1}/F_{BAND3}$ | $F_{BAND2}/F_{BAND3}$ | 1 |

RECEIVING CIRCUIT AND RECEIVING METHOD

BACKGROUND OF THE INVENTION

1. Field of the invention

The present invention relates to a receiving circuit and a receiving method for receiving a multi-carrier signal in a radio communication system, and particularly, a receiving circuit and a receiving method for receiving a radio signal multiplexed by a multi-band Orthogonal Frequency Division Multiplexing (OFDM).

2. Description of the Related Art

Ultra Wide Band (UWB) communication is proposed as close range and large volumetric radio communication recently. Especially, a proposal of a UWB system for Multi-Band Orthogonal Frequency Division Multiplexing (MB-OFDM) is coming under the spotlight. MB-OFDM is discussed under TG3a of IEEE 802.15 committee in order to standardize. Details of MB-OFDM are described in IEEE P802.15-03/268r1 and IEEE P802.15-03/267r6.

A basic technique about OFDM and MB-OFDM is described below. OFDM is a communication method which is called a multi-carrier communication method. A multi-carrier communication method transmits data using a plurality of carriers. OFDM transmits and receives a plurality of bits using a plurality of carriers. A plurality of carriers are called sub-carriers in OFDM. Center frequencies of any two carriers, which are adjacent with each other, are orthogonal in sub-carriers, and single frequency band of OFDM is occupied with a plurality of sub-carriers.

In a normal OFDM system, each sub-carrier is modulated by using multi-value Quadrature Amplitude Modulation (QAM), so that one sub-carrier can transmits a plurality of bits. Therefore, in case that m sub-carriers are used in OFDM communication and each sub-carrier can transmit n bits, m*n bits of data are transmitted at once in OFDM, data transmitted at once is called one symbol.

Modulation and demodulation in OFDM are described below. FIG. 11 shows a transmitting apparatus and a receiving apparatus which modulate or demodulates data in OFDM system. In OFDM modulation, serial data for transmission is supplied to transmitting apparatus. A serial-parallel converter 1101 of the transmitting apparatus converts serial data to parallel data. This serial-parallel conversion is carried out because OFDM uses a plurality of carriers at once.

Then, sub-carrier modulators 1102 modulate sub-carriers as described above. Multi-value QAM shows a plurality of bits using amplitude and phase. Data of multi-value QAM shown in complex number plane.

Sub-carrier modulated signals are inverse discrete Fourier transformed. This transform is performed in each sub-carrier frequency. Signals, which are inverse discrete Fourier transformed and synthesized by inverse discrete Fourier transformer (IFFT) 1103, are transmitted as an OFDM signal (multi-carrier signals) via D/A converter 1104 and antenna. More processes are performed in order to transmit an OFDM signal, however, these processes are omitted here.

In demodulation of a modulated signal, an inversed operation described above is performed. In a receiving apparatus, received signals are detected and an OFDM signal is taken out. An OFDM signal is converted to a digital signal by an A/D converter 1105. Fourier transformer (FFT) 1106 discrete Fourier transforms a digital signal and separates a signal to a plurality of sub-carrier signals. Then, sub-carrier demodulators 1107 demodulate sub-carrier signals. A parallel-serial converter 1108 converts sub-carrier signals to serial data, and received data is output.

In OFDM method, in order to accurately demodulate a sub-carrier modulated signal, noises that are introduced in transmission path have to be removed by signal processing. In signal processing, a phase rotation amount of a received symbol has to be obtained in order to adjust and remove a phase noise due to fluctuation of a local frequency of a transmitting apparatus and a receiving apparatus. Therefore, several sub-carriers are set as pilot-sub-carriers in OFDM. Pilot-sub-carriers are predetermined sub-carriers, and pilot-sub carriers do not have data. In a receiving apparatus, a phase rotation amount is calculated based on pilot-sub-carriers.

MB-OFDM included in OFDM varies a frequency band occupied by a symbol. For example, assuming that center frequencies of frequency bands occupied by a plurality of sub-carriers correspond to f0, f1 and f2, MB-OFDM changes a center frequency of a frequency band by every symbol, such as f0 to f1, f1 to f2 and f2 to f0. This operation is called frequency hopping. FIG. 12 shows transmitted symbols with frequency hopping. FIG. 12 shows an example of transmitted data D1 to D17 with frequency band hopping, such as BAND1 to BAND2 and BAND2 to BAND3.

In case that a symbol is received in an OFDM system, a phase rotation amount of the received symbol has to be calculated in order to accurately reproduce received information. A phase rotation amount is calculated using pilot-sub-carriers interposed in data sub-carriers. Phase rotation amounts of pilot-sub-carriers can not use directly to adjust a symbol because of unexpected noise or fading. Therefore, in single band OFDM without frequency hopping, calculated phase rotation amounts are smoothed among a plurality of OFDM symbols. Smoothed phase rotation amount is used in order to adjust a received symbol. In this specification, "smoothing phase rotation amounts" means calculated phase amounts are smoothed among a plurality of OFDM symbols.

On the other hands, MB-OFDM performs frequency hopping by every symbol. Therefore, a frequency band of the latest OFDM symbol is different from that of OFDM symbol received before.

Therefore, a receiving circuit and a receiving method that can calculate a phase rotation amount and perform phase tracking are required in MB-OFDM.

SUMMARY OF THE INVENTION

A receiving circuit which receives information using a multi-carrier signal comprises a phase rotation amount calculator which calculates a phase rotation amount of a multi-carrier signal included in a first frequency band according to a pilot-sub carrier included in the first frequency band, a converter which calculates a phase rotation amount of a multi-carrier signal included in a second frequency band according to the phase rotation amount of the multi carrier signal included in the first frequency band.

A receiving method which receives information using a multi-carrier signal comprises calculating a phase rotation amount of a multi-carrier signal included in a first frequency band according to a pilot-sub carrier included in the first frequency band, calculating a phase rotation amount of a multi-carrier signal included in a second frequency band according to the phase rotation amount of the multi carrier signal included in the first frequency band.

BRIEF DESCRIPTION OF THE DRAWINGS

The above and other objects, advantages and features of the present invention will be more apparent from the following description taken in conjunction with the accompanying drawings, in which:

FIG. 7 is a conversion table;

PREFERRED EMBODIMENT OF THE INVENTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

As described above, in single band OFDM without frequency hopping, calculated phase rotation amounts are smoothed among a plurality of OFDM symbols. A smoothed phase rotation amount is used in order to adjust a received symbol.

In MB-OFDM, symbols are transmitted using a plurality of frequency bands. Therefore, considering that smoothing phase rotation amounts among a plurality of OFDM symbols in order to accurately decode received symbols, received symbols can not be smoothed because frequency bands of symbols are different with each other. On the other hand, if symbols occupying a same frequency band are picked out and pilot-sub-carriers of picked out symbols, that is, pilot-sub-carriers having same frequency band are only used, accuracy of the calculation of phase rotation amounts is decreased. Therefore, in the present invention, a phase rotation amount which is calculated from a symbol received at one frequency band is converted to another phase rotation amount received at another frequency band. The receiving circuit of the present invention has a circuit to perform this conversion.

Figure 1:
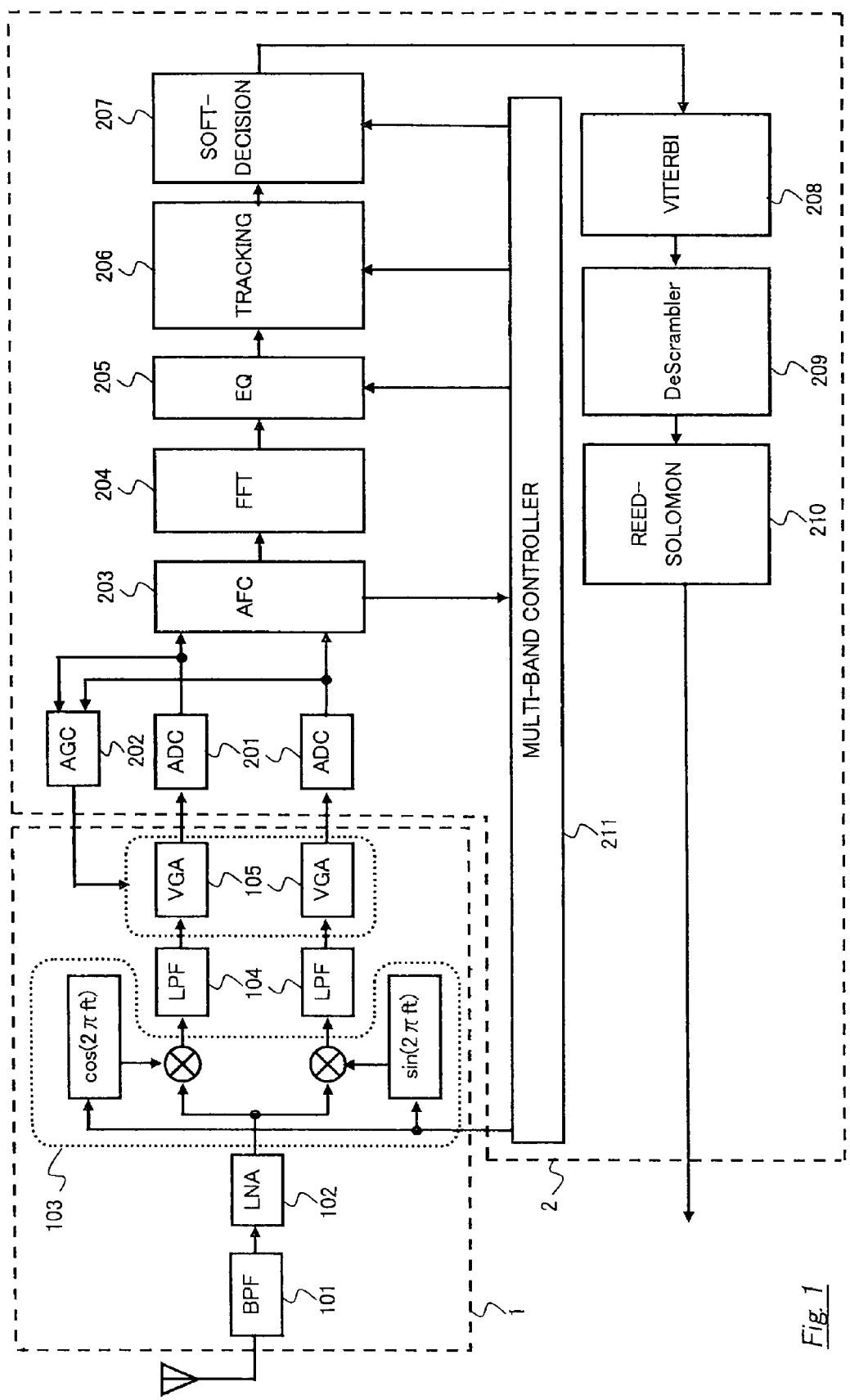
FIG. 1 shows a block diagram of a receiving apparatus based on an MB-OFDM method of the present invention.

Hereinafter, the preferred embodiment of the present invention is described with reference to drawings. An overview of an OFDM signal receiving apparatus of the present invention is described below. FIG. 1 shows a block diagram of a receiving apparatus based on MB-OFDM method of the present invention. As shown in FIG. 1, the receiving apparatus of the present embodiment have an RF unit 1 and a BB unit 2. The RF unit 1 demodulates a received radio signal and outputs a complex baseband signal (hereinafter, baseband signal). The BB unit 2 performs a digital baseband processing to a baseband signal output from the RF unit 1, and outputs received data which is transmitted by a transmitting apparatus.

The RF unit 1 of the present embodiment has a band pass filter (BPF) 101, a low noise amplifier (LNA) 102, an orthogonal demodulation circuit 103, a low pass filter (LPF) 104 and a variable gain amplifier (VGA) 105. The BB unit 2 has an A/D converter (ADC) 201, an automatic gain control circuit (AGC) 202, an automatic frequency control circuit (AFC) 203, a fast Fourier transformation circuit (FFT) 204, an equalizer (EQ) 205, a tracking circuit (TRACKING) 206, a demodulation soft-decision circuit (SOFT-DECISION) 207, a Viterbi error correction circuit (VITERBI) 208, a descrambler 209, a Reed-Solomon error correction circuit (REED-SOLOMON) 210 and a multi-band controller 211.

The band pass filter 101 is a filter that passes a signal within a predetermined frequency band from a signal received by an antenna. The band pass filter 101 passes a signal that corresponds to MB-OFDM band through.

The low noise amplifier 102 amplifies the signal that passes through the band pass filter 101, and outputs an amplified signal. The low noise amplifier is disposed in order to amplify a received signal that is weak.

The orthogonal demodulation circuit 103 converts a received signal into a baseband signal. This conversion is performed by multiplying a received signal by sine and cosine waves that are correspond to main carrier wave. A received signal is separated into a real part and an imaginary part. The real part corresponds to an in-phase component (I channel) and an imaginary part corresponds to an orthogonal component (Q channel). A control signal output from a multi-band controller 211 is supplied to a unit which generates sine and cosine waves. A local oscillator which is used in orthogonal demodulation oscillates in a frequency based on the control signal. The control signal is determined based on the center frequency of the frequency band of the received OFDM signal. The center frequency is detected by the AFC circuit 203 which carries out a carrier sense operation.

The received signal is converted to the signal which has a frequency band of the baseband signal by the orthogonal demodulator. A received baseband signal which has a frequency band to demodulate received data passes through the low pass filter 104. The signal which passes through the low pass filter 104 is amplified by the variable gain amplifier 105 and input to the BB unit 2. In this operation, an amplification degree of the variable gain amplifier 105 is controlled by a control signal output by the AGC circuit 202.

The RF unit 1 converts the received signal to the baseband signal and The A/D converter 201 converts the analog baseband signal to the digital signal. The digital baseband signal converted by the A/D converter 202 is input to the AFC circuit 203. The output signal of the A/D converter 201 is also input to the AGC circuit 202. The AGC circuit 202 controls the gain of the variable gain amplifier 105 according to the electrical power of the received signal; thereby a dynamic range of the A/D converter 201 is used effectively.

The AFC circuit 203 performs carrier sense operation and corrects the frequency error between a receiving apparatus and a transmitting apparatus. The center frequency of the RF signal is estimated by synchronizing the timing (hopping synchronization) of the MB-OFDM signal in this carrier sense operation. Thereby, the frequency band of the received OFDM signal is detected by this carrier sense operation. The AFC circuit 203 outputs a signal which indicates a frequency hopping to the multi-band controller 211 based on the detected frequency band.

The signal after the carrier sense operation and the frequency error correction by the AFC circuit 203 is input to the Fourier transform circuit 204. A discrete Fourier transform is performed to the digital baseband signal in the Fourier transform circuit 204. The signal of time scale is converted to the signal of frequency scale of sub-carrier by this Fourier transform. The equalizer 205 corrects skew of the signal converted to the signal of frequency scale.

The frequency error that is not removed by the AFC circuit 203 and a phase distortion such as a phase noise because of the fluctuation of local frequencies of a receiving apparatus and a transmitting apparatus are adjusted in the tracking circuit 206. The adjusted signal is input to the demodulation soft-decision circuit 207.

The demodulation soft-decision circuit 207 performs de-mapping operation to the phase-adjusted and frequency-adjusted signal and makes a soft-decision of the received digital signal. The Viterbi error correction circuit 208 interleaves the digital signal and a Viterbi error correction is performed. The error corrected signal using a Viterbi decoding is input to the descrambler 209. The descrambler 209 removes a scramble that is made in a transmitting apparatus. The Reed-Solomon error correction circuit 210 corrects error according to Reed-Solomon code and outputs the digital signal.

The multi-band controller 211 outputs a control signal which corresponds to the center frequency of the occupied frequency band by the received symbol to the orthogonal demodulation circuit 103, the equalizer 205, the tracking circuit 206 and the demodulation soft-decision circuit 207 based on the center frequency detected by the AFC circuit 203.

The present embodiment relates to a tracking circuit 206 of the above configured OFDM receiving circuit. Therefore, phase tracking in OFDM method is described below. As described above, a plurality of bit are transmitted by one sub-carrier in OFDM method. Therefore, sub-carrier modulation is performed in OFDM system. For example, multi-value QAM which represents a plurality of bits by phase and amplitude of a sub-carrier is used in sub-carrier modulation.

Figure 2B:
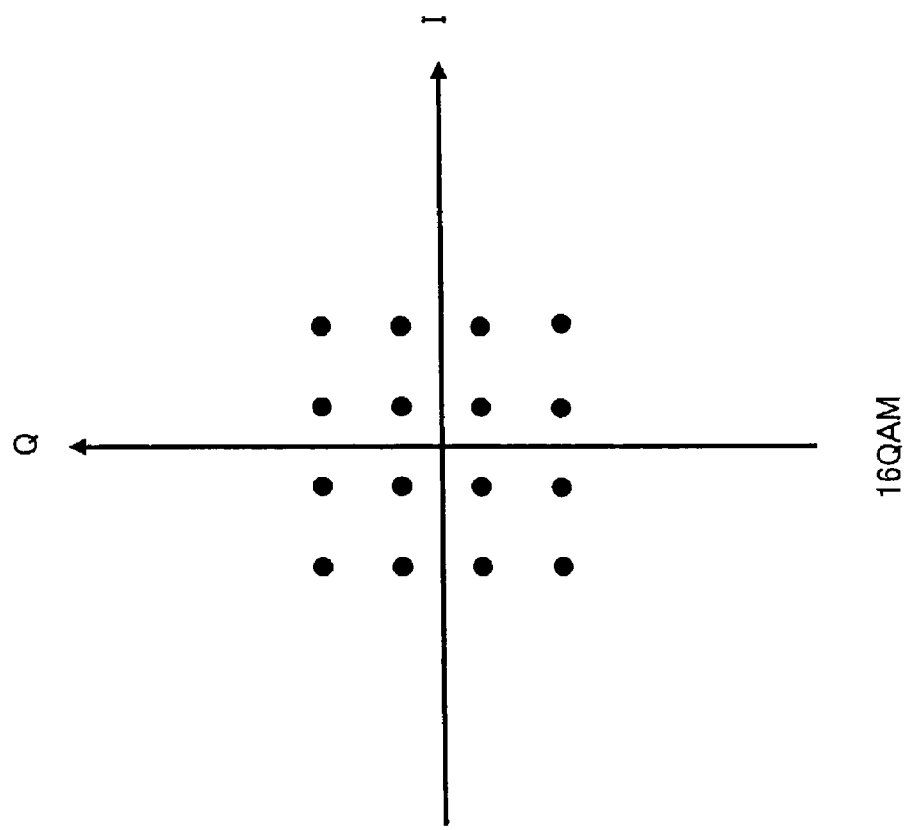
FIG. 2B shows 16 QAM in a complex plane.
Figure 2A:
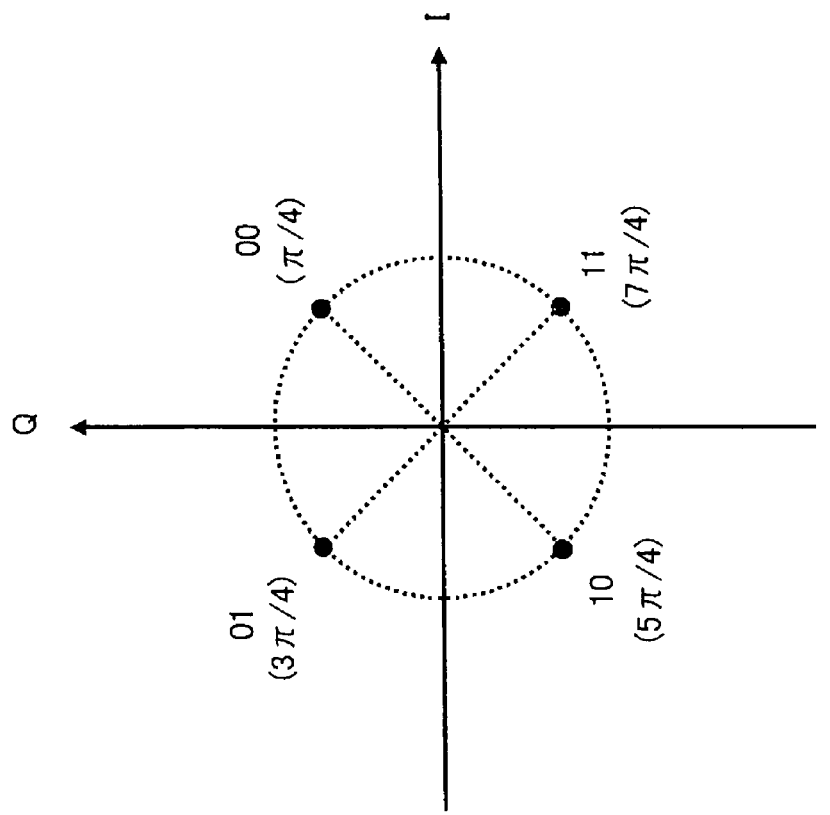
FIG. 2A shows QPSK in a complex plane.

QPSK represents 2 bits by using 4 points that are different in phase with each other. This QPSK is shown in FIG. 2A by using a complex plane. In QPSK, as shown in FIG. 2A, the points corresponding to $\pi/4$, $3\pi/4$, $5\pi/4$ and $7\pi/4$ of the complex plane shows "00", "01", "10" and "11". In 16 QAM and 64 QAM, an amplitude factor is added in addition to the phase factor, and the one sub-carrier represents 4 bits or 6 bits of data (See FIG. 2B). In case that the phase of the received point which is received by a receiving apparatus is misaligned because of phase noise, the receiving apparatus may wrongly determine received data because data is represented by using phase. Therefore, the tracking circuit 206 calculates the phase rotation amount and correct phase in the receiving apparatus.

Figure 3:
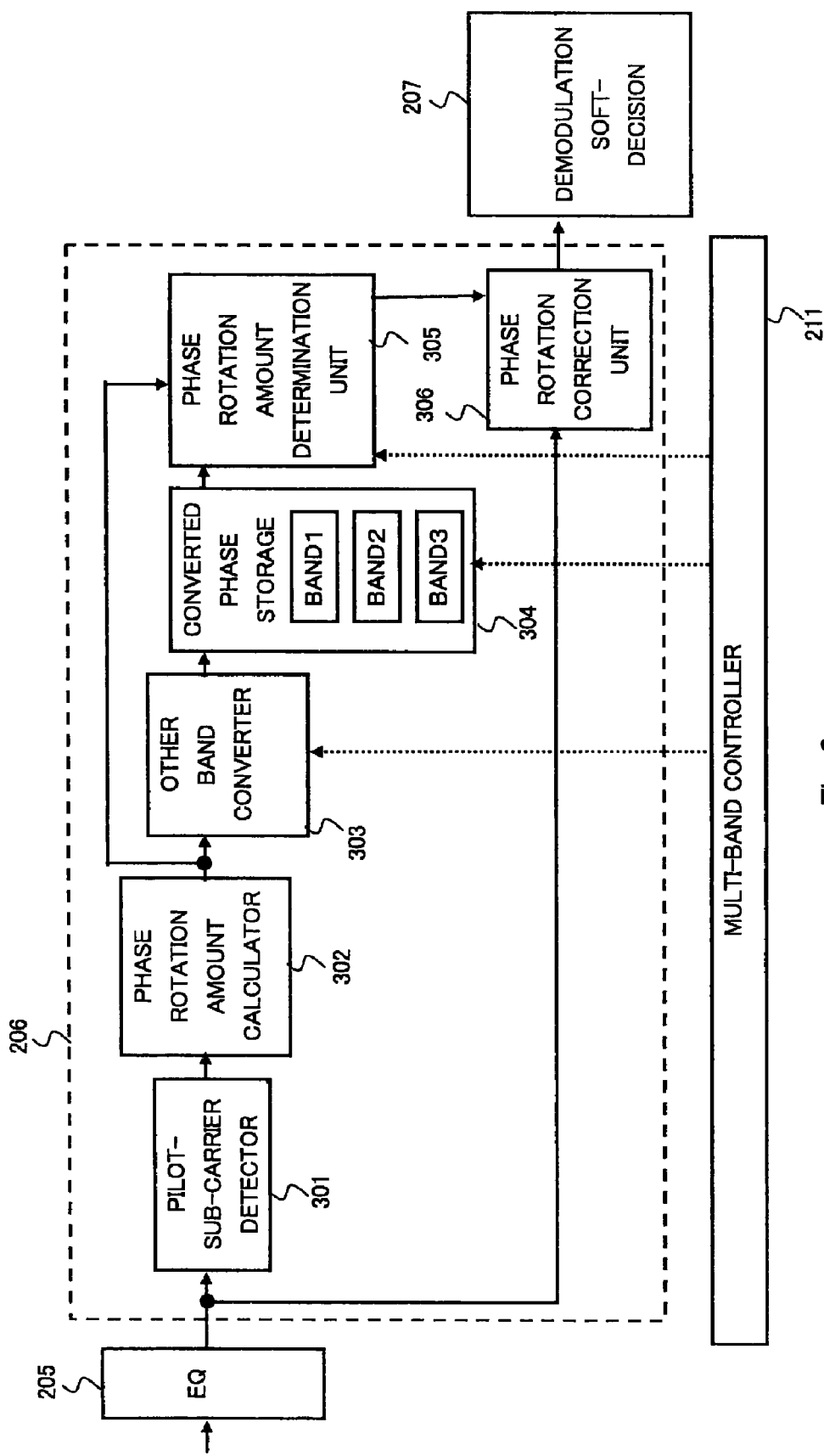
FIG. 3 shows a tracking circuit of the present embodiment.

FIG. 3 shows a tracking circuit of the present embodiment. The tracking circuit of the present embodiment has a pilot-sub-carrier detector 301, a phase rotation amount calculator 302, an other band converter 303, a converted phase storage 304, a phase rotation amount determination unit 305 and phase rotation correction unit 306.

The pilot-sub-carrier detector 301 detects a plurality of pilot-sub-carriers that correspond to pilot-sub-carriers included in the received signal (symbol). The phase rotation amount calculator 302 calculates a phase rotation amount of the received signal (symbol) according to pilot-sub-carriers included in the received symbol. A calculation result the phase rotation amount calculator 302 is output to the other band converter 304 and the phase rotation amount determination unit 305. According to the calculation result of the phase rotation amount calculator 302, the other band converter 304 calculates the phase rotation amount of the other band which is different from the frequency band of the received symbol, and outputs a calculation result of the other band converter 303 to the converted phase storage 304.

The converted phase storage 304 stores the phase rotation amounts of each band. As described above, phase rotation amounts are calculated by the other band converter 303. The phase rotation amount determination unit 305 determines a final phase rotation amount of the received symbol based on the calculation result of the phase rotation amount calculator 302 and other band conversion result stored in the converted phase storage 304. The phase rotation correction unit 306 rotates the signal which is output by the equalizer 205 based on the phase rotation amount determined by the phase rotation amount determination unit 305, and output the rotated signal to the demodulation soft-decision circuit 207. In the present embodiment, the phase rotation amount which corresponds to the symbol which is one symbol ahead than the received latest symbol is stored in the converted phase storage 304, thereby even if the frequency band of the received latest symbol is different from the frequency band of the symbol which was received before, both symbols can be used in calculating a phase rotation amount. According to the present invention, if a plurality of symbols are transmitted using different frequency bands due to frequency hopping, a plurality of symbols can be used in obtaining phase rotation amount. A variety of methods exist in order to smooth phase rotation amounts, however, in this embodiment, the phase rotation determination unit 305 smoothes phase rotation amounts using a plurality of symbols. The plurality of symbols are transmitted using different frequencies with each other using frequency hopping.

A smoothing of phase rotation amounts is generally carried out as described below. If the latest received symbol corresponds to nth symbol, the converted phase rotation amount of one symbol ahead ((n−1)th) is stored in the converted phase storage 304. In case that the phase rotation amount of the nth symbol is represented by $\Delta\theta(n)$ and the phase rotation amount of the (n−1)th symbol is represented by $\Delta\theta(n-1)$, the phase rotation amount $\Delta\theta\_dif(n)$ of one symbol can be calculated based on the difference between $\Delta\theta(n-1)$ and $\Delta\theta(n)$.

$$\Delta\theta\_dif(n)=\Delta\theta(n)-\Delta\theta(n-1)$$

Smoothing can be carried out by obtaining a moving average of calculated $\Delta\theta\_dif(n)$.

$$\Delta\theta\_dif\_ave=f\_ave\{\Delta\theta\_dif(n)\}$$

Herein, f_ave { } means moving average function. An implementation of moving average function is variable, for example, a simple moving average method using simple moving average of several taps (number of average object) and an adaptive moving average method which changes number of taps dynamically are devised. However, description of moving average method is omitted herein.

Since obtained $\Delta\theta\_dif\_ave$ corresponds to phase rotation amount between one symbol and another symbol, the phase rotation amount $\Delta\theta\_correct$ of the nth received symbol can be represented below.

$$\Delta\theta\_correct=\Delta\theta\_dif\_ave*n$$

Therefore, the phase rotation amount $\Delta\theta\_correct$ of the nth received symbol can be obtained by multiplying $\Delta\theta\_dif\_ave$ by n.

In the present invention, phase rotation amounts of the symbols that are transmitted using variable frequency bands are converted in order to fit other bands. Thereby, the phase rotation amount determination unit 305 smoothes these phase rotation amounts using the converted phase rotation amounts. As described above, variable methods can be applied to smoothing, and other methods except for described methods can be applied to smoothing. In order to realize the present invention, smoothing phase rotation amounts can be carried out by using converted phase rotation amount to fit each band.

The operation of tracking circuit shown in FIG. 3 is described below. The pilot-sub-carrier detector 301 detects pilot-sub-carriers included in a received symbol. In MB-OFDM, for example, a band from 3.1 GHz to 10.6 GHz is divided into 14 bands and each divided band has a 528 MHz band width (See FIG. 4). 128 sub carriers are assigned to each band and 12 sub carriers among 128 sub-carriers correspond to pilot sub carriers. One symbol corresponds to one divided band, therefore the pilot sub-carrier detector 301 detects 12 pilot sub-carriers when one symbol is received by the pilot sub-carrier detector 301.

Figures 5, 6:
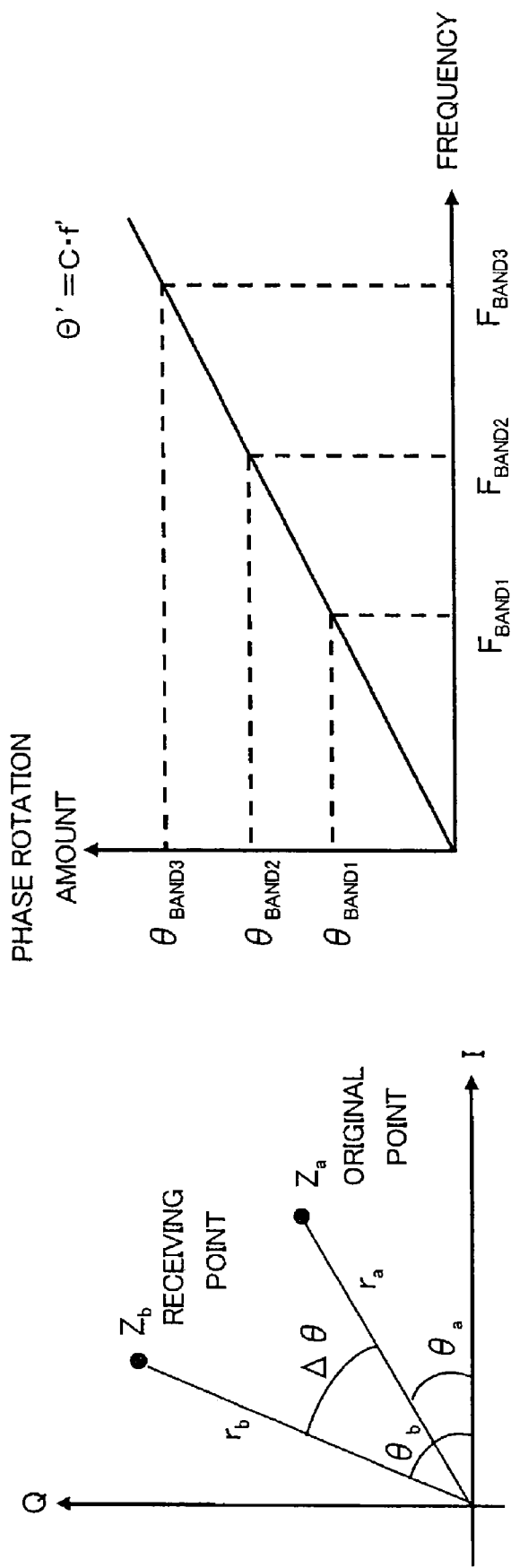
FIG. 5 is a drawing to describe this calculation of a phase rotation amount.
FIG. 6 shows a relationship between frequency and phase rotation amount.

The phase rotation amount calculator 302 calculates a phase rotation amount according to pilot-sub-carriers included in OFDM signal of the received symbol. FIG. 5 is a drawing to describe this calculation of a phase rotation amount. Za of FIG. 5 shows an original signal point corresponding to one pilot sub-carrier. Zb of FIG. 5 shows a signal point corresponding to a received pilot sub-carrier. When a phase rotation amount $\Delta\theta$ shown in FIG. 5 is calculated, calculation described below is performed.

1) Original signal point is divided by received signal point in complex number and phase difference vector is obtained.
2) Arctangent is calculated based on the obtained phase difference vector and phase difference vector is converted to phase difference.

Herein, as shown in FIG. 5, Za is represented (Xa, Ya) in complex plane and Zb is represented (Xb, Yb) in complex plane. When Za is expressed by Za=(Xa, Ya)=Ra*(cos θa+j*sin θa) and Zb is expressed by Zb=(Xb, Yb)=Ra*(cos θb+j*sin θb), the formula 1 described below is true.

$$\frac{Z_a}{Z_b} = \frac{x_a + jy_a}{x_b + jy_b}$$
$$= \frac{(x_a + jy_a)(x_b - jy_b)}{(x_b + jy_b)(x_b - jy_b)}$$
$$= \frac{1}{x_b^2 + y_b^2}\{(x_a x_b + y_a y_b) + j(y_a x_b - x_a y_b)\}$$
$$= \frac{1}{x_b^2 + y_b^2}\{(r_a\cos\theta_a r_b\cos\theta_b + r_a\sin\theta_a r_b\sin\theta_b) + j(r_a(\sin\theta_a r_b\cos\theta_b - r_a\cos\theta_a r_b\sin\theta_b)\}$$
$$= \frac{1}{x_b^2 + y_b^2}\{r_a r_b(\cos\theta_a\cos\theta_b + \sin\theta_a\sin\theta_b) + jr_a r_b(\sin\theta_a\cos\theta_b - \cos\theta_a\sin\theta_b)\}$$
$$= \frac{r_a r_b}{x_b^2 + y_b^2}\{\cos(\theta_a - \theta_b) + j\sin(\theta_a - \theta_b)\}$$
$$= \frac{r_a r_b}{r_b^2\cos^2\theta_b + r_b^2\sin^2\theta_b}\{\cos(\theta_a - \theta_b) + j\sin(\theta_a - \theta_b)\}$$
$$= \frac{r_a r_b}{r_b^2}\frac{\{\cos(\theta_a - \theta_b) + j\sin(\theta_a - \theta_b)\}}{\cos^2\theta_b + \sin^2\theta_b}$$
$$= \frac{r_a}{r_b}\{\cos(\theta_a - \theta_b) + j\sin(\theta_a - \theta_b)\}$$

A phase rotation amount corresponding to one pilot sub-carrier can be obtained by converting a phase difference vector described above into a phase difference. As described above, one symbol occupying a predetermined band width includes a plurality of pilot-sub-carriers. Thereby, when number of pilot-sub-carriers is expressed by n and a phase difference vector of kth pilot-sub-carrier is expressed by $\Delta P_{h\_err}(k)$, a phase rotation amount $\Delta\theta_{ofdm}$ calculated by the phase rotation amount calculator 302 corresponds to formula 2 described below.

$$\Delta\theta_{ofdm} = \sum_{k=1}^{n} \Delta P_{h\_err}(k)$$

The other band converter 303 calculates phase rotation amounts of the other bands (second frequency band) based on the phase rotation amount of the received symbol (phase rotation amount of first frequency band). This calculation and conversion is described hereinafter. As described above, in MB-OFDM method, the center frequency of the frequency band of transmitted symbol is changed by every symbol. A phase rotation amount varies according to a frequency band. In the other band converter 303, phase rotation amounts of the other bands are calculated and estimated using the phase rotation amount of the received symbol which has a band width of received frequency band. The basis of this calculation is described below.

When a phase rotation amount is represented by $\Delta\theta$ and frequency deviation between a transmitting apparatus and receiving apparatus is represented by $\Delta f$ and a period of one symbol (symbol length) is represented by t, the formula 3 described below is true.

$$\Delta\theta = 2\pi * \Delta f * t$$

Herein, $2\pi$ is a constant number and t is a predetermined value defined by a standard. Therefore, $2\pi t$ is represented by a constant number C ($2\pi t = C$). The above formula 3 can be rewritten as described below.

$$\Delta\theta = C * \Delta f \quad \text{(formula 4)}$$

According to the formula 4, the relationship between a given frequency f' and a phase rotation amount $\Theta'$ at f' can be expressed as shown in formula 5 and FIG. 6.

$$\Theta' = C * f'$$

Therefore, when a phase rotation amount of a given frequency band is calculated, phase rotation amounts of the other frequency bands can be calculated based on the phase rotation amount of the given frequency band.

Figure 4:
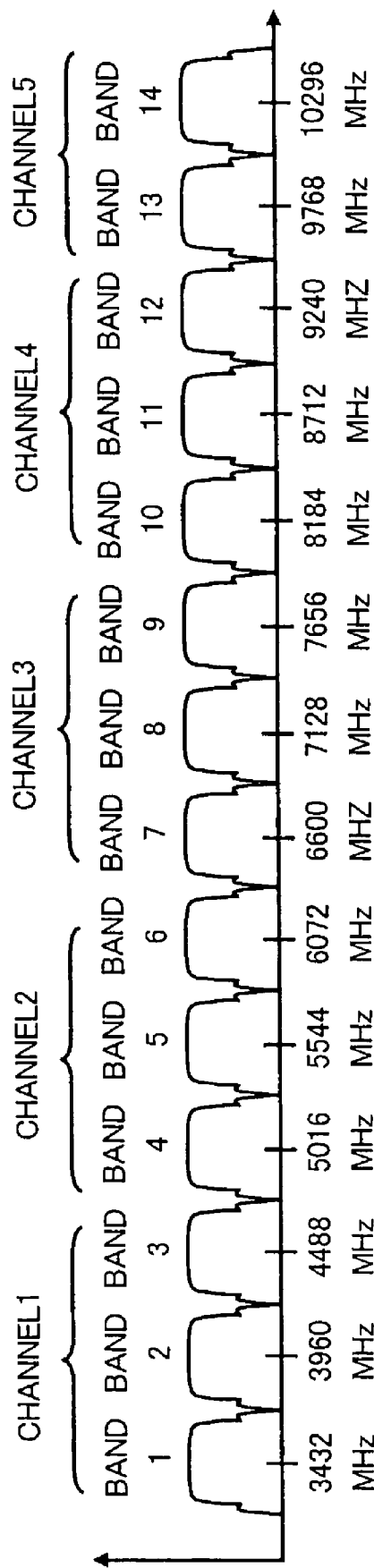
FIG. 4 shows frequency band of OFDM.

For example, when the center frequency of BAND1 shown in FIG. 4 is represented by $F_{BAND1}$ and the phase rotation amount at $F_{BAND1}$ is represented by $\theta_{BAND1}$, the above described constant number C is expressed below.

$$C = \theta_{BAND1}/F_{BAND1}$$

The similar fashion is able to apply to the other band.

$$C = \theta_{BAND1}/F_{BAND1} = \theta_{BAND2}/F_{BAND2} = \theta_{BAND3}/F_{BAND3}$$

When a phase rotation amount of a received signal of received frequency band (for example, BAND1) is calculated, phase rotation amounts of the other frequency bands can be calculated as described below.

$$\theta_{BAND2} = (\theta_{BAND1}/F_{BAND1}) * F_{BAND2}$$

$$\theta_{BAND3} = (\theta_{BAND1}/F_{BAND1}) * F_{BAND3}$$

Thereby, when data is transmitted among 3 bands from BAND1 to BAND 3 with frequency hopping, it is able to calculate phase rotation amounts of the other bands according to the received symbol by preparing a table shown in FIG. 7. The other band converter 304 has a memory unit such as a ROM, and the table shown in FIG. 7 is stored in the memory unit. The other band converter 303 multiplies a calculation result of the phase rotation calculator 302 by data of the conversion table which corresponds to the received band, thereby phase rotation amounts of the other bands are calculated. The result of the other band conversion is stored by the converted phase storage 304.

The converted phase storage 304 temporarily stores the converted result of the other band converter 303. The converted phase storage 304 outputs the phase rotation amount of the symbol which is one symbol ahead than the latest received symbol to the phase rotation amount determination unit 305. In detail, the converted phase storage 304 outputs the phase rotation amount of one ahead before the received latest symbol, the output phase rotation amount is converted to correspond to the received latest frequency band.

Two phase rotation amounts are input to the phase rotation amount determination unit 305. One is the phase rotation amount which is output by the phase rotation amount calculator 302 and corresponds to the received latest symbol, the other is the phase rotation amount which is one symbol ahead than the received latest symbol, and is converted to correspond to the received latest frequency band. The phase rotation amount determination unit 305 smoothes these inputs and determines the final phase rotation amount of the received latest symbol. The phase rotation amount determination unit 305 calculates a correction value based on the determined phase rotation amount and outputs the correction value to the phase rotation correction unit 306.

The phase rotation correction unit 306 corrects a phase distortion of the signal output by the equalizer 205 based on the correction value output by the phase rotation amount determination unit 305.

In the above described configuration, the other band converter 303, the converted phase storage 304 and the phase rotation amount determination unit 305 receive a control signal which is generated by the multi-band controller 211 and indicate the frequency band of the latest received symbol, because these components operate based on the frequency band of the latest received symbol.

Figure 8:
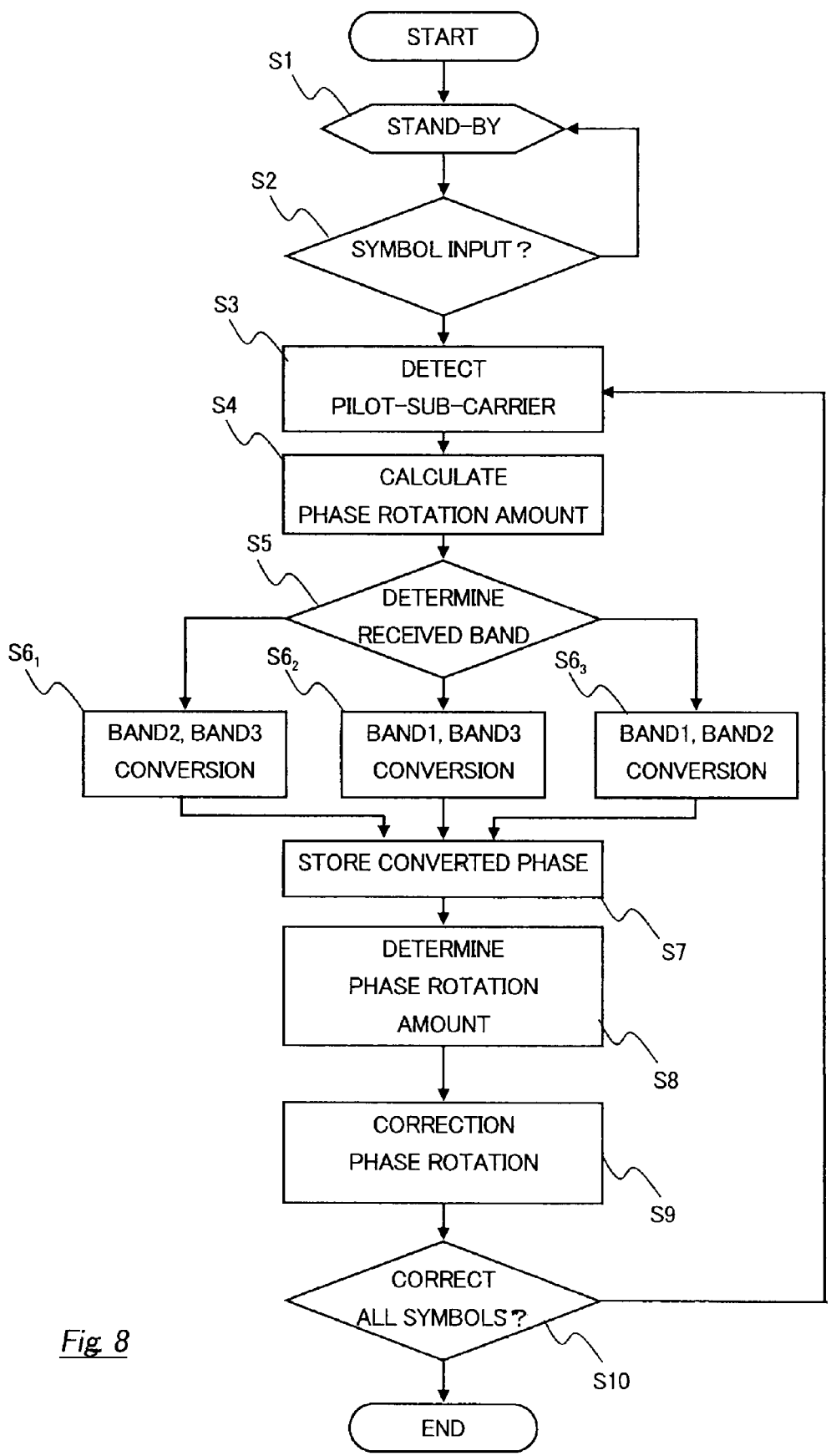
FIG. 8 is a flow chart showing the tracking method of the present invention.

A phase tracking method of the above described tracking circuit 206 is described below using a flow chart. FIG. 8 is a flow chart showing the tracking method carried out by the tracking circuit 206.

Step 1 to Step 3 (S1, S2, S3)

The tracking circuit 206 is in a stand-by state until a symbol to correct a phase rotation amount is input after a receiving circuit starts a receiving operation (See FIG. 8, S1 and S2). When a symbol to carry out a phase tracking is received and a signal processed by the FFT 204 and equalizer 205 is input to the phase tracking circuit 206, the pilot-sub-carrier detector 301 detects pilot-sub-carriers.

Step 4 (S4)

The phase rotation amount calculator 302 calculates the phase rotation amount of the received symbol based on the detected pilot-sub-carriers (See FIG. 8, S4). The calculated phase rotation amount is output to the other band converter 303 and the phase rotation amount determination unit 305.

Step 5 to Step 7 (S5, S6, S7)

The other band converter 303 determines a frequency band of the received symbol based on a control signal output by the multi-band controller 211 and calculates phase rotation amounts corresponding to the frequency bands except for the frequency band of the received symbol (See FIG. 8, $S6_1$, $S6_2$, $S6_3$). The calculated phase rotation amounts are stored in the converted phase storage 304 (See FIG. 8, S7).

Step 8 (S8)

In the phase rotation amount determination unit 305, smoothing phase rotation amounts and determination of the correction value of the received symbol is performed using two phase rotation amounts. One is the phase rotation amount which is calculated in S4, and the other is the phase rotation amount which is stored in the converted phase storage and is one symbol ahead than the received latest symbol.

Steps 9 and 10 (S9, S10)

In the phase rotation correction unit 306, a phase correction of the received symbol is performed based on the correction value determined in S8 (See FIG. 8, S9). When the phase correction about all received symbols is finished, phase tracking operation ends. If symbol is input sequentially and phase correction of next symbol is not finished, tracking operation is back to S3 and processing is repeated (See FIG. 8, S10).

Figure 9:
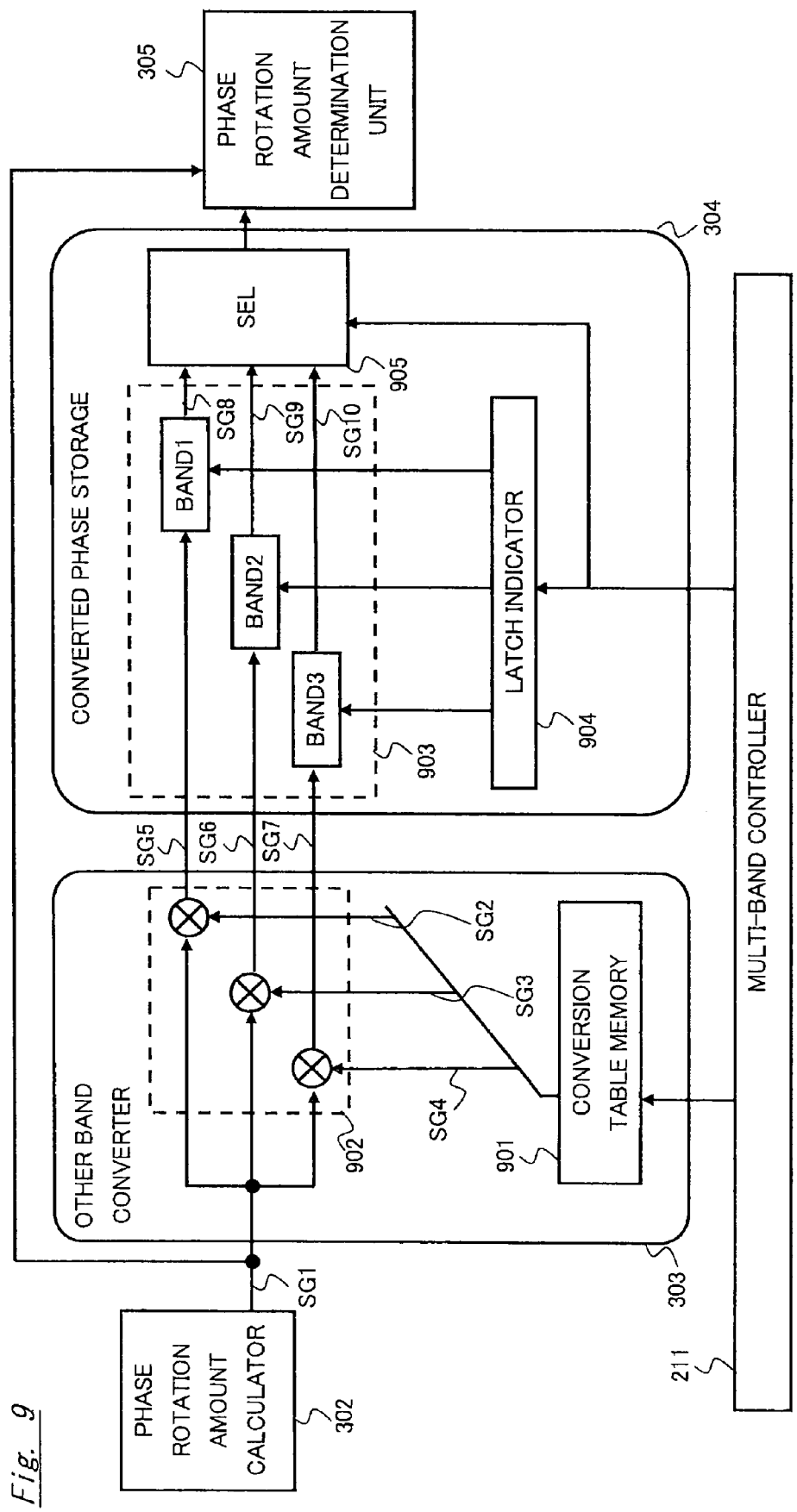
FIG. 9 shows the other band converter 303 and the converted phase storage 304.

Main components to perform above described operation correspond to the other band converter 303 and the converted phase storage 304. Therefore, operations of these components are described in detail. FIG. 9 shows the other band converter 303 and the converted phase storage 304. The other band converter 303 has a conversion table memory 901 and a multiplier 902. For example, ROM can be used as a conversion table memory 901. The converted phase storage 304 has a phase memory 903, latch indicator 904 and selector 905.

The conversion table memory 901 is a memory to store conversion table shown in FIG. 7. For example, a predetermined address of the conversion table memory is selected according to the frequency band of the received symbol and the conversion table memory output a coefficient, which is stored in selected address, to calculate phase rotation amount of the other band. The multiplier 902 multiplies the phase rotation amount calculated in phase rotation amount calculator 302 by the coefficient output from the conversion table memory 901, and output multiplied phase rotation amount.

The phase memory 903 fetches output of the other band converter 303 according to an indication of the latch indicator 904 and stores the output of the other band converter 303. The latch indicator 904 outputs an indication to the phase memory based on the frequency band of the received symbol, therefore the indication shows what phase rotation amount the phase memory 903 has to store. A received band signal SB is input to the conversion table memory 901, the latch indicator 904 and selector 905 by the multi-band controller 211.

Figure 10:
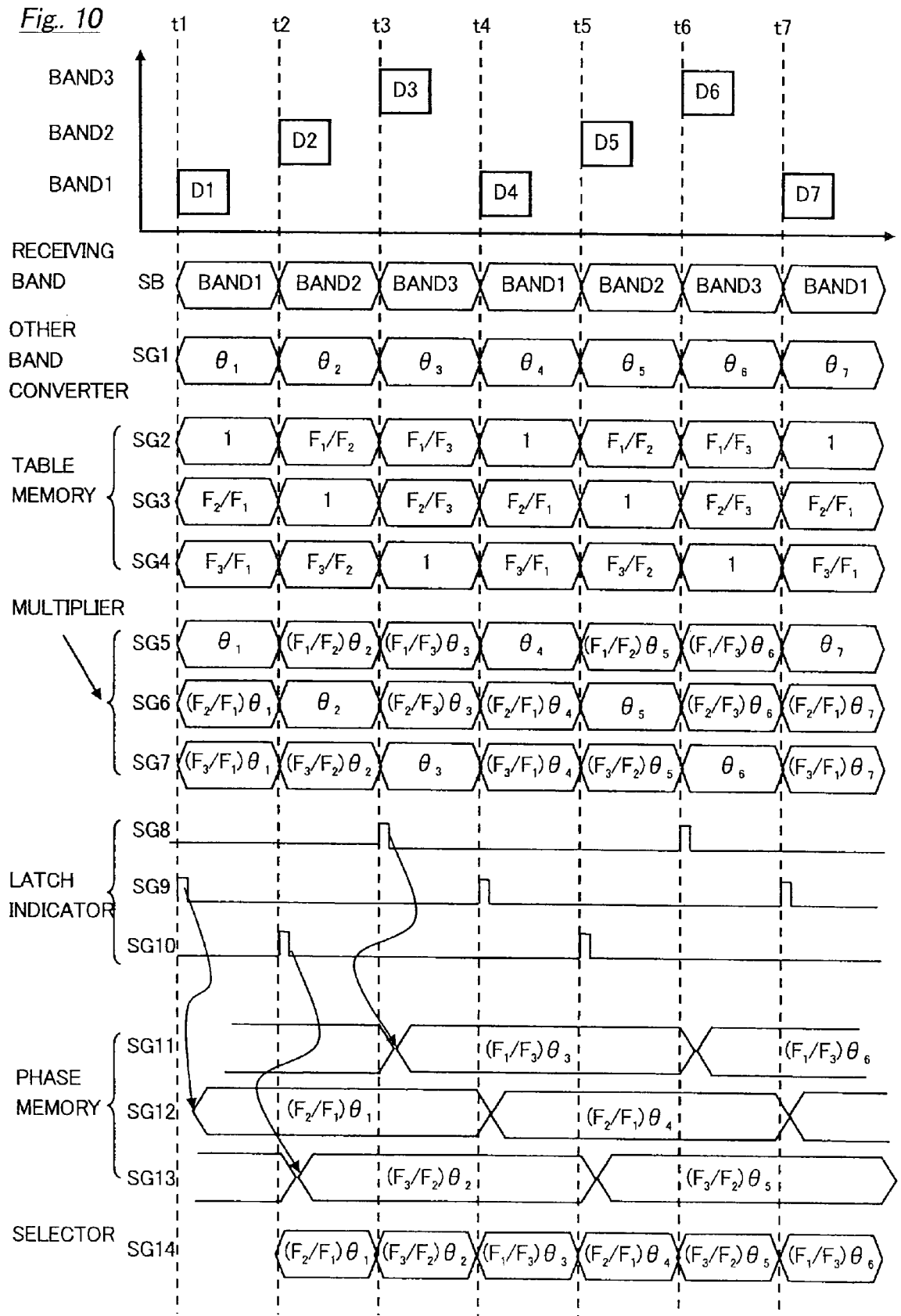
FIG. 10 shows signals when a plurality of symbols are received.
Figure 11:
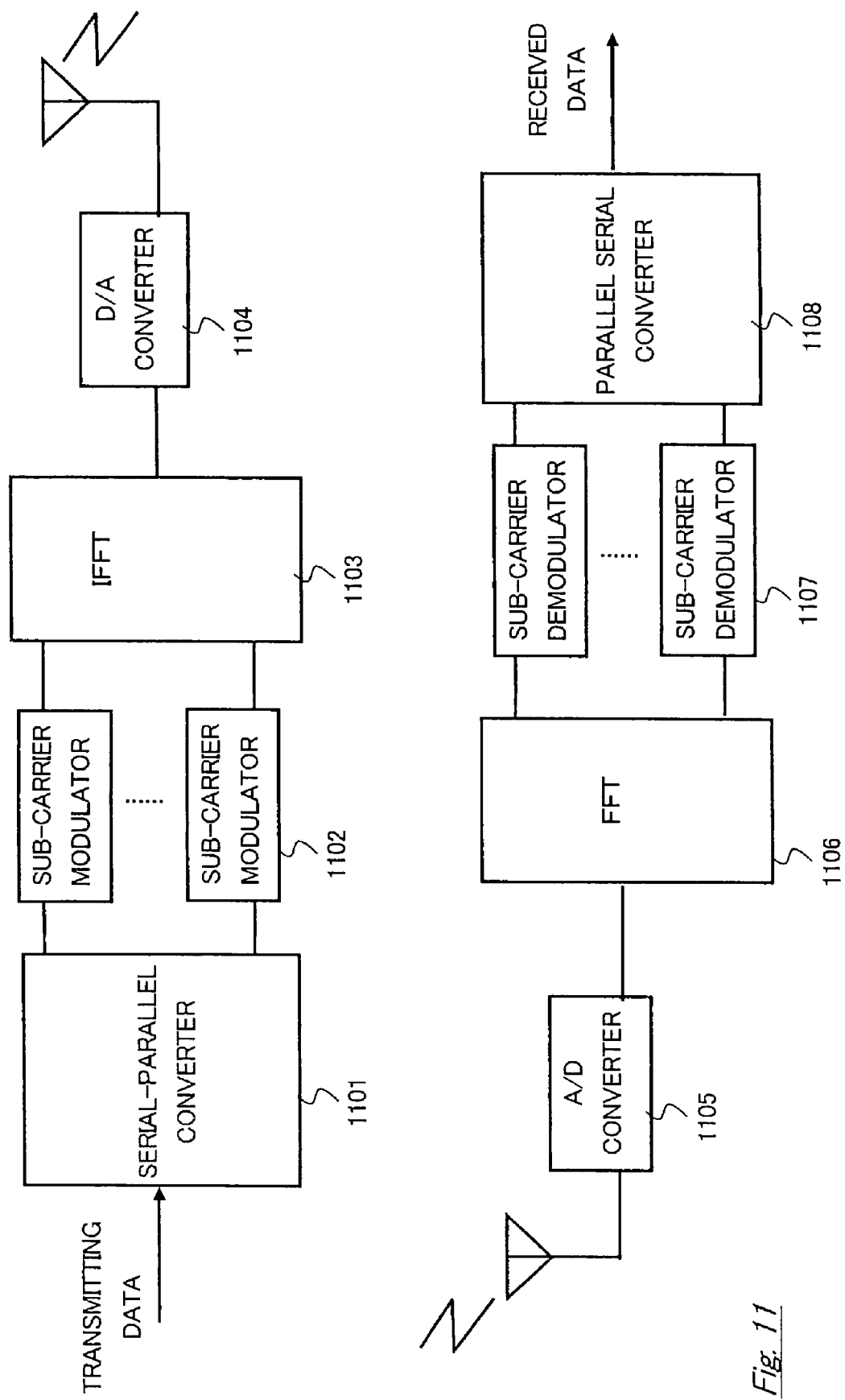
FIG. 11 shows a transmitting apparatus and a receiving apparatus which modulate or demodulate data in OFDM system.
Figure 12:
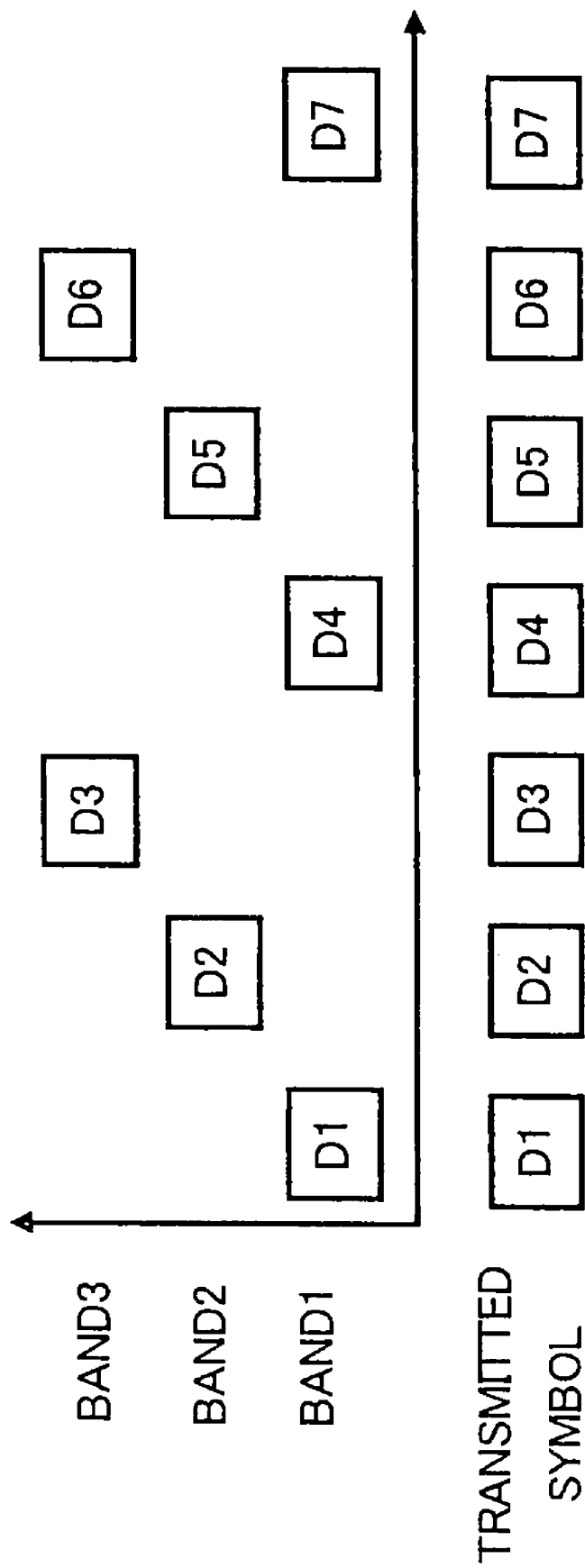
FIG. 12 shows transmitted symbols with frequency hopping.

More specific operation of the above described operation is described below using FIG. 10. FIG. 10 shows signals when a plurality of symbols D1 to D7 is received. In FIG. 10, changes of frequency bands by frequency hopping are set such as BAND1 to BAND2, BAND2 to BAND3 and BAND3 to BAND1, and symbols D1 to D7 are received sequentially. Further, center frequencies $F_{BAND1}$ of BAND1, $F_{BAND2}$ of BAND2 and $F_{BAND3}$ of BAND3 are abbreviated like $F_1$, $F_2$ and $F_3$ in FIG. 10.

Symbol D1 which occupies frequency band BAND1 is input to the tracking circuit 206 at time t1 in FIG. 10. In tracking circuit 206, the phase rotation amount $\theta_1$ of symbol D1 is calculated by the pilot-sub-carrier detector 301 and the phase rotation amount calculator 302. This $\theta_1$ is input to the other band converter 303 (See FIGS. 9 and 10, SG1). The multi-band controller 211 outputs a received band signal SB which indicates that the received symbol D1 occupies frequency band BAND1 to the other band converter 303, the converted phase storage 304.

A predetermined address of the conversion table memory 901 is selected based on the received band signal SB. The conversion table memory 901 outputs 1, $F_{BAND2}/F_{BAND1}$ and $F_{BAND3}/F_{BAND1}$, these coefficients correspond to BAND1 in conversion table shown in FIG. 7 (See FIGS. 9 and 10, SG2 to SG4).

The multiplier 902 calculates phase rotation amounts $(F_{BAND2}/F_{BAND1})*\theta_1$ and $(F_{BAND3}/F_{BAND1})*\theta_1$ that correspond to phase rotation amounts when symbol D1 occupying frequency band BAND2 or BAND3 is input, and outputs $(F_{BAND2}/F_{BAND1})*\theta_1$ and $(F_{BAND3}/F_{BAND1})*\theta_1$ (See FIGS. 9 and 10, SG5 to SG7).

When the received signal indicates BAND1, the latch indicator 904 outputs a latch indication signal which indicates to overwrite a part of the phase memory 903. In this case, the part to be overwritten corresponds to a part which stores converted result of phase rotation amount about BAND2 (See FIGS. 9 and 10, SG5 to SG9). Therefore, the phase memory 903 fetches SG6 shown in FIGS. 9 and 10 as a result converted to other band. In this example, $(F_{BAND2}/F_{BAND1})*\theta_1$ is output and the phase memory 903 stores $(F_{BAND2}/F_{BAND1})*\theta_1$ (See FIGS. 9 and 10, SG12).

Then, symbol D2 is input to the tracking circuit at time t2. A received band signal SB which indicates that the received symbol D2 occupies frequency band BAND2 is input to the selector 905 of the converted phase storage 304. The selector 905 selects SG9 which is a converted result of the phase rotation amount about BAND2, and output SG9 (See FIGS. 9 and 10, SG11). The phase rotation amount determination unit 305 determines the final phase rotation amount of the received latest symbol according to the calculated phase rotation amount about the received latest symbol D2 and the conversion result $(F_{BAND2}/F_{BAND1})*\theta_1$ which is converted value of phase rotation amount of symbol D1 to correspond to BAND2. The same operations are repeated based on a frequency band of a received symbol as shown in FIG. 10. Thereby, in the receiving circuit of the present invention, appropriate correction of phase rotation amount is achieved by using a received latest symbol and a symbol received one symbol ahead than the received latest symbol even if MB-OFDM.

As described in detail, even if MB-OFDM which hops the frequency band by every symbol, it is able to calculate phase rotation amount of the received symbol and correct phase of the received symbol. The present invention is not limited to the embodiment, that can be modified For example, multiplier 902 and phase memory 903 shown in FIGS. 9 and 10 has not to correspond to number of frequency bands, coefficients to input or information to fetch can be switched based on change of the signal which indicates received frequency band.

It is apparent that the present invention is not limited to the above embodiment, that may be modified and changed without departing from the scope and spirit of the invention.

What is claimed is:

1. A receiving circuit which receives information using a multi-carrier signal, the receiving circuit comprising:
   a phase rotation amount calculator which calculates a phase rotation amount of a multi-carrier signal included in a first frequency band according to a pilot-sub carrier included in the first frequency band;
   a converter which calculates a phase rotation amount of a multi-carrier signal included in a second frequency band according to the phase rotation amount of the multi-carrier signal included in the first frequency band; and
   a phase rotation amount determination unit which smoothes the phase rotation amounts and determines a correction value of the received multi-carrier signal using the phase rotation amount of the multi-carrier signal included in a first frequency band from the phase rotation amount calculator and the phase rotation amount of the multi-carrier signal included in a second frequency band from the converter.

2. The receiving circuit according to claim 1, further comprising:
   a converted phase storage which stores the phase rotation amount of the multi-carrier signal included in the second frequency band calculated by the converter.

3. The receiving circuit according to claim 1, further comprising:
   a phase rotation correction unit which corrects a phase of the multi-carrier signal included in the second frequency band according to the correction value of the received multi-carrier signal determined by the phase rotation amount determination unit.

4. The receiving circuit according to claim 1, wherein the converter includes a conversion table memory which stores a coefficient to calculate the phase rotation amount of the multi-carrier signal included in the second frequency band.

5. The receiving circuit according to claim 2, wherein the converter includes a conversion table memory which stores a coefficient to calculate the phase rotation amount of the multi-carrier signal included in the second frequency band.

6. The receiving circuit according to claim 2, wherein the converted phase storage outputs calculation result of the phase rotation amount of the multi-carrier signal included in the second frequency band according to the phase rotation amount of the multi-carrier signal included in the first frequency band when the multi-carrier signal of included in the second frequency band is input.

7. A receiving method which receives information using a multi-carrier signal, the method comprising:
   calculating, by a phase rotation amount calculator, a first phase rotation amount of a received multi-carrier signal in a first frequency band based on detected pilot-sub-carriers;
   determining, by a multi-band controller, a frequency band of the received multi-carrier signal;
   calculating, by a converter, a plurality of other phase rotation amounts corresponding to the frequency bands except for the first frequency band according to the phase rotation amount of the received multi-carrier signal in the first frequency band; and
   smoothing phase rotation amounts and determining of a correction value of the received multi-carrier signal, by a phase rotation amount determination unit, using the first phase rotation amount of the received multi-carrier signal in the first frequency band from the phase rotation calculator and the other phase rotation amounts corresponding to the frequency bands from the converter.

8. The receiving method of claim 7, further comprising:
   storing the other phase rotation amounts from the converter, in a converted phase storage, of the multi-carrier signal included in the other frequency bands calculated according to the phase rotation amount of the received multi-carrier signal in the first frequency band.

9. The receiving method of claim 8, further comprising:
   performing a phase correction of the received multi-carrier signal based on the determined correction value.

10. The receiving method according to claim 7, wherein the calculation of the other phase rotation amounts of a multi-carrier signal included in a second frequency band according to the phase rotation amount of the multi carrier signal included in the first frequency band is carried out by multiplying the phase rotation amount of the multi-carrier signal included in the first frequency by a predetermined coefficient.

* * * * *